US007818351B2

(12) United States Patent
Nomura et al.

(10) Patent No.: US 7,818,351 B2
(45) Date of Patent: Oct. 19, 2010

(54) APPARATUS AND METHOD FOR DETECTING A RELATION BETWEEN FIELDS IN A PLURALITY OF TABLES

(75) Inventors: Yoshihide Nomura, Kawasaki (JP); Tsuyoshi Kanai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 539 days.

(21) Appl. No.: 11/591,967

(22) Filed: Nov. 1, 2006

(65) Prior Publication Data
US 2008/0021867 A1    Jan. 24, 2008

(30) Foreign Application Priority Data
Jul. 19, 2006    (JP)    ............... 2006-197294

(51) Int. Cl.
    *G06F 17/00*    (2006.01)
(52) U.S. Cl. ................. 707/803; 707/790; 707/808
(58) Field of Classification Search ............... 707/101, 707/102, 103, 790, 803, 808
    See application file for complete search history.

(56) References Cited

U.S. PATENT DOCUMENTS

| 5,615,367 | A | 3/1997 | Bennett et al. |
| 6,631,380 | B1 | 10/2003 | Cason et al. |
| 2001/0000536 | A1* | 4/2001 | Tarin ................... 707/102 |
| 2003/0158850 | A1* | 8/2003 | Lawrence et al. ........... 707/100 |
| 2003/0167275 | A1* | 9/2003 | Rjaibi ................... 707/101 |

FOREIGN PATENT DOCUMENTS

JP    2005-115494    4/2005

OTHER PUBLICATIONS

Okada et al.; "An Algorithm to Count the Number of Repeated Patient Data Entries with B Tree"; Computers and Biomedical Research, Academic Press; vol. 18, No. 2; Apr. 1985; pp. 121-124.
Mehovic et al.; "generation of Short Unique Key Values for Database Tables"; IP Com Journal; Jun. 1, 1993; pp. 477-480.

* cited by examiner

*Primary Examiner*—Jean B. Fleurantin
*Assistant Examiner*—Thu-Nguyet Le
(74) *Attorney, Agent, or Firm*—Greer, Burns & Crain, Ltd.

(57) ABSTRACT

There is provided a database analysis program, a database analysis apparatus, and a database analysis method capable of detecting a relation between fields in a plurality of tables. The database analysis program allows a computer to execute: a field evaluation step that calculates, for each field of the table, a field score which is a value based on the appearance frequency of each value in the field; a relation generation step that selects tables different from each other as a relation source table and relation destination table from the plurality of tables, selects a relation source field which is a field in the relation source table and a relation destination table which is a field in the relation destination table, and generates a combination of the relation source field and relation destination field as a relation; and a relation evaluation step that calculates, for each relation generated by the relation generation step, a relation score which is a value based on the appearance frequency of each value in the relation destination field counted for each relation source field, field score of the relation source field, and field score of the relation destination field.

20 Claims, 16 Drawing Sheets

FIG. 3

| DATE | ORDER NUMBER | REGION | CHARGE |
|---|---|---|---|
| 6/1 | A01 | TOKYO | A |
| 6/2 | A02 | TOKYO | A |
| 6/5 | A03 | KANAGAWA | A |
| 6/6 | A04 | KANAGAWA | B |

FIG. 4

| DATE | PRODUCTION NUMBER | ORDER NUMBER | ARTICLE NUMBER | DELIVERY DEADLINE |
|---|---|---|---|---|
| 6/2 | S01 | A01 | P01 | 6/6 |
| 6/5 | S02 | A01 | P02 | 6/10 |
| 6/6 | S03 | A02 | P01 | 6/10 |
| 6/6 | S04 | A03 | P03 | 6/10 |
| 6/6 | S05 | A03 | P03 | 6/11 |
| 6/8 | S06 | A04 | P02 | 6/15 |

FIG. 5

| DATE | ARRANGEMENT NUMBER | ORDER NUMBER | ARTICLE NUMBER | DELIVERY DESTINATION |
|---|---|---|---|---|
| 6/10 | T01 | A01 | P01 | TOKYO |
| 6/11 | T02 | A01 | P02 | TOKYO |
| 6/11 | T03 | A01 | P02 | TOKYO |
| 6/12 | T04 | A02 | P01 | TOKYO |
| 6/14 | T05 | A03 | P03 | KANAGAWA |
| 6/15 | T06 | A04 | P02 | KANAGAWA |

FIG. 6

| DATE | ARRANGEMENT NUMBER | DELIVERY SERVICE NUMBER | DELIVERY DESTINATION |
|---|---|---|---|
| 6/19 | T01 | H01 | TOKYO |
| 6/19 | T02 | H01 | TOKYO |
| 6/19 | T03 | H01 | TOKYO |
| 6/19 | T04 | H01 | TOKYO |
| 6/21 | T05 | H02 | KANAGAWA |
| 6/22 | T06 | H03 | KANAGAWA |

FIG. 7

| PRODUCTION NUMBER | APPEARANCE FREQUENCY |
|---|---|
| S01 | 1 |
| S02 | 1 |
| S03 | 1 |
| S04 | 1 |
| S05 | 1 |
| S06 | 1 |

| ORDER NUMBER | APPEARANCE FREQUENCY |
|---|---|
| A01 | 2 |
| A02 | 1 |
| A03 | 2 |
| A04 | 1 |

| ARTICLE NUMBER | APPEARANCE FREQUENCY |
|---|---|
| P01 | 2 |
| P02 | 2 |
| P03 | 2 |

| DELIVERY DEADLINE | APPEARANCE FREQUENCY |
|---|---|
| 6/6 | 1 |
| 6/10 | 3 |
| 6/11 | 1 |
| 6/15 | 1 |

FIG. 9

ORDER ENTRY DB

| DATE | ORDER NUMBER | RELATION SOURCE APPEARANCE FREQUENCY | RELATION DESTINATION APPEARANCE FREQUENCY |
|---|---|---|---|
| 6/1 | A01 | 1 | 2 |
| 6/2 | A02 | 1 | 1 |
| 6/5 | A03 | 1 | 2 |
| 6/6 | A04 | 1 | 1 |

PRODUCTION DB

| DATE | ORDER NUMBER |
|---|---|
| 6/2 | A01 |
| 6/5 | A01 |
| 6/6 | A02 |
| 6/6 | A03 |
| 6/6 | A03 |
| 6/8 | A04 |

FIG. 10

ORDER ENTRY DB

| DATE | ORDER NUMBER |
|---|---|
| 6/1 | A01 |
| 6/2 | A02 |
| 6/5 | A03 |
| 6/6 | A04 |

PRODUCTION DB

| DATE | ORDER NUMBER | RELATION SOURCE APPEARANCE FREQUENCY | RELATION DESTINATION APPEARANCE FREQUENCY |
|---|---|---|---|
| 6/2 | A01 | 2 | 1 |
| 6/5 | A01 | | |
| 6/6 | A02 | 1 | 1 |
| 6/6 | A03 | 2 | 1 |
| 6/6 | A03 | | |
| 6/8 | A04 | 1 | 1 |

APPARATUS AND METHOD FOR DETECTING A RELATION BETWEEN FIELDS IN A PLURALITY OF TABLES

BACKGROUND OF THE INVENTION

1. Field of the Invention

The present invention relates to a database analysis program, a database analysis apparatus, and a database analysis method that analyze a plurality of databases.

2. Description of the Related Art

In monitoring a business process, an event indicating the business progress is acquired through update of a business DB (Database) or acquisition of communication contents. "Business process" indicates the flow of the business carried out across a plurality of business systems. One event is stored as one record in a DB table. Further, one event includes a set of values for each field, such as event generation time.

As a prior art related to the present invention, there is known a business process tracking apparatus that collects events, organizes the events in units of business data, relates a plurality of business data with one another, and outputs a relation between the business data in a tree form according to search conditions (refer to, e.g., Patent Document 1: Jpn. Pat. Appln. Laid-Open Publication No. 2005-115494).

However, when establishing a relation among the DBs in a prior art like the above Patent Document, it has been necessary for a user to manually check the schema or structure of data to thereby set a related field as a key. Further, there may be cases where the definition of the schema cannot be obtained or a data field differs among business systems. Thus, without the knowledge or experience to manage the business to be analyzed, it is difficult for the user to determine which field is to be treated as a key and by which field the DBs are related to one another. Further, when establishing a relation among different DBs, the user needs to check the data in the DBs in order to determine whether the relation actually exists.

There is known "computer-assisted name identification" as a system for detecting matching of records between different DBs. The computer-assisted name identification detects a record in a given DB having a common set of values to those in one record in another DB. This system is utilized for, e.g., reconciling items on a receipt corresponding to an order form. However, this system is designed to visualize the business flow and it cannot detect a relation between the entire data set.

SUMMARY OF THE INVENTION

The present invention has been made to solve the above problem, and an object thereof is to provide a database analysis program, a database analysis apparatus, and a database analysis method capable of detecting a relation between fields in a plurality of tables.

To solve the above problems, according to a first aspect of the present invention, there is provided a database analysis program allowing a computer to analyze a plurality of tables, the program comprising: a field evaluation step that calculates, for each field of the table, a field score which is a value based on the appearance frequency of each value in the field; a relation generation step that selects tables different from each other as a relation source table and relation destination table from the plurality of tables, selects a relation source field which is a field in the relation source table and a relation destination table which is a field in the relation destination table, and generates a combination of the relation source field and relation destination field as a relation; and a relation evaluation step that calculates, for each relation generated by the relation generation step, a relation score which is a value based on the appearance frequency of each value in the relation destination field counted for each relation source field, field score of the relation source field, and field score of the relation destination field.

In the database analysis program according to the present invention, the relation generation step selects a key field which is a field in the relation source table and generates a combination of the relation source field, relation destination field, and key field as a relation, and the relation evaluation step calculates a relation score of the relation generated by the relation generation step, the relation score being a value based on the appearance frequency of each value in the relation destination field counted for each relation source field, field score of the relation source field, field score of the relation destination field, and field score of the key field.

In the database analysis program according to the present invention, the smaller the appearance frequency of each value in the field is, the smaller the field score becomes, and the relation generation step selects the relation source field from a field whose field score is smaller than a predetermined field score threshold.

In the database analysis program according to the present invention, the closer the appearance frequency of each value in the relation destination field counted for each relation source field is to 1, the larger the relation score becomes, and the smaller the field score for each field included in the relation and the field score of the key field are, the larger the relation score becomes, and the relation evaluation step selects a predetermined number of relations in the descending order of the relation score thereof.

The database analysis program according to the present invention further comprises a relation structure generation step that selects a combination of a plurality of relations selected by the relation evaluation step to generate a relation structure.

In the database analysis program according to the present invention, the relation structure generation step selects the relation combination according to a predetermined rule.

The database analysis program according to the present invention further comprises a relation structure evaluation step that calculates a relation structure score which is a value based on the relation score of the relations included in the relation structure generated by the relation structure generation step.

In the database analysis program according to the present invention, the relation structure evaluation step selects a relation structure having the largest relation structure score.

In the database analysis program according to the present invention, the relation structure evaluation step displays a predetermined number of the relation structures in the descending order of the relation structure score thereof.

In the database analysis program according to the present invention, the relation structure evaluation step displays field values included in the relation in the relation structure.

According to a second aspect of the present invention, there is provided a database analysis apparatus that analyzes a plurality of tables, comprising: a field evaluation section that calculates, for each field of the table, a field score which is a value based on the appearance frequency of each value in the field; a relation generation section that selects tables different from each other as a relation source table and relation destination table from the plurality of tables, selects a relation source field which is a field in the relation source table and a relation destination table which is a field in the relation destination table, and generates a combination of the relation source field and relation destination field as a relation; and a relation evaluation section that calculates, for each relation generated by the relation generation section, a relation score which is a value based on the appearance frequency of each value in the relation destination field counted for each relation source field, field score of the relation source field, and field score of the relation destination field.

In the database analysis apparatus according to the present invention, the relation generation section selects a key field which is a field in the relation source table and generates a combination of the relation source field, relation destination field, and key field as a relation, and the relation evaluation section calculates a relation score of the relation generated by the relation generation section, the relation score being a value based on the appearance frequency of each value in the relation destination field counted for each relation source field, field score of the relation source field, field score of the relation destination field, and field score of the key field.

In the database analysis apparatus according to the present invention, the smaller the appearance frequency of each value in the field is, the smaller the field score becomes, and the relation generation section selects the relation source field from a field whose field score is smaller than a predetermined field score threshold.

In the database analysis apparatus according to the present invention, the closer the appearance frequency of each value in the relation destination field counted for each relation source field is to 1, the larger the relation score becomes, and the smaller the field score for each field included in the relation and the field score of the key field are, the larger the relation score becomes, and the relation evaluation section selects a predetermined number of relations in the descending order of the relation score thereof.

15. The database analysis apparatus according to the present invention further comprises a relation structure generation section that selects a combination of a plurality of relations selected by the relation evaluation section to generate a relation structure.

In the database analysis apparatus according to the present invention, the relation structure generation section selects the relation combination according to a predetermined rule.

The database analysis apparatus according to the present invention further comprises a relation structure evaluation section that calculates a relation structure score which is a value based on the relation score of the relations included in the relation structure generated by the relation structure generation section.

In the database analysis apparatus according to the present invention, the relation structure evaluation section selects a relation structure having the largest relation structure score.

In the database analysis apparatus according to the present invention, the relation structure evaluation section displays a predetermined number of the relation structures in the descending order of the relation structure score thereof.

According to a third aspect of the present invention, there is provided a database analysis method that analyzes a plurality of tables, comprising: a field evaluation step that calculates, for each field of the table, a field score which is a value based on the appearance frequency of each value in the field; a relation generation step that selects tables different from each other as a relation source table and relation destination table from the plurality of tables, selects a relation source field which is a field in the relation source table and a relation destination table which is a field in the relation destination table, and generates a combination of the relation source field and relation destination field as a relation; and a relation evaluation step that calculates, for each relation generated by the relation generation step, a relation score which is a value based on the appearance frequency of each value in the relation destination field counted for each relation source field, field score of the relation source field, and field score of the relation destination field.

According to the present invention, a relation between fields in a plurality of tables can be detected.

BRIEF DESCRIPTION OF THE DRAWINGS

FIG. 3 is a table showing an example of entries in an order entry DB 80a according to the present embodiment;

FIG. 4 is a table showing an example of entries in a production DB 80b according to the present embodiment;

FIG. 5 is a table showing an example of entries in an arrangement DB 80c according to the present embodiment;

FIG. 6 is a table showing an example of entries in a delivery DB 80d according to the present embodiment;

FIG. 7 is a table showing an example of a multiplicity calculation step according to the present embodiment;

FIG. 9 is a table showing a first example of the relation strength calculation step according to the present embodiment;

FIG. 10 is a table showing a second example of the relation strength calculation step according to the present embodiment;

DETAILED DESCRIPTION OF THE PREFERRED EMBODIMENTS

An embodiment of the present invention will be described later with reference to the accompanying drawings.

First Embodiment

A configuration of a database analysis apparatus according to the present embodiment will firstly be described.

Figure 1:
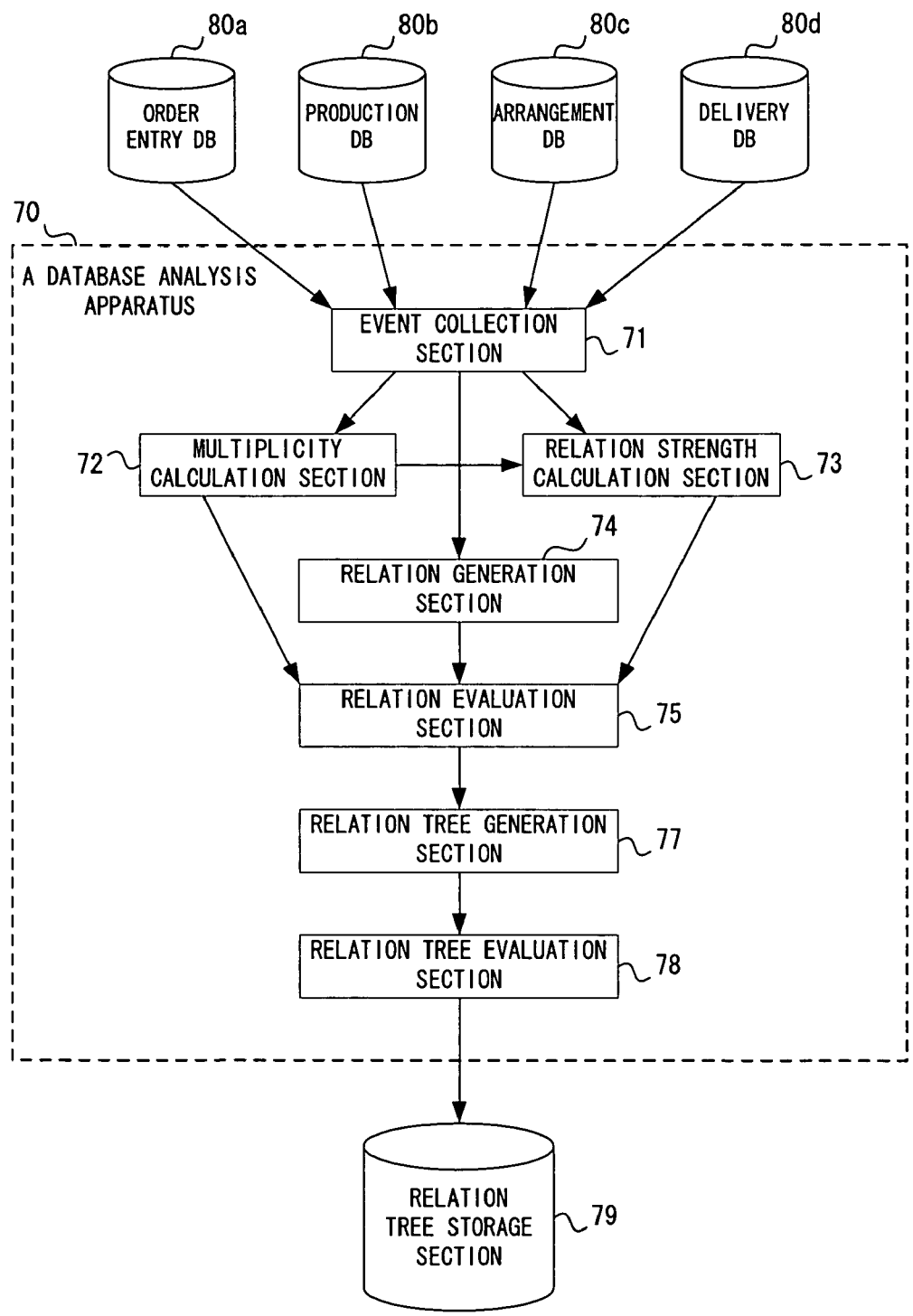
FIG. 1 is a block diagram showing an example of a configuration of a database analysis apparatus according to the present embodiment.

FIG. 1 is a block diagram showing an example of a configuration of a database analysis apparatus according to the present embodiment. A database analysis apparatus 70 shown in FIG. 1 is connected to a plurality of DBs (tables) and a relation tree storage section 79. As the plurality of DBs, an order entry DB 80a, a production DB 80b, an arrangement DB 80c, and a delivery DB 80d are installed in the present embodiment. The database analysis apparatus 70 includes an event collection section 71, a multiplicity calculation section 72 (field evaluation section), a relation strength calculation section 73, a relation generation section 74, a relation evaluation section 75, a relation tree generation section 77 (relation structure generation section), and a relation tree evaluation section 78 (relation structure evaluation section). A relation evaluation section corresponds to the relation strength calculation section 73 and relation evaluation section 75 in the embodiment.

Operation of the database analysis section according to the present embodiment will next be described.

Figure 2:
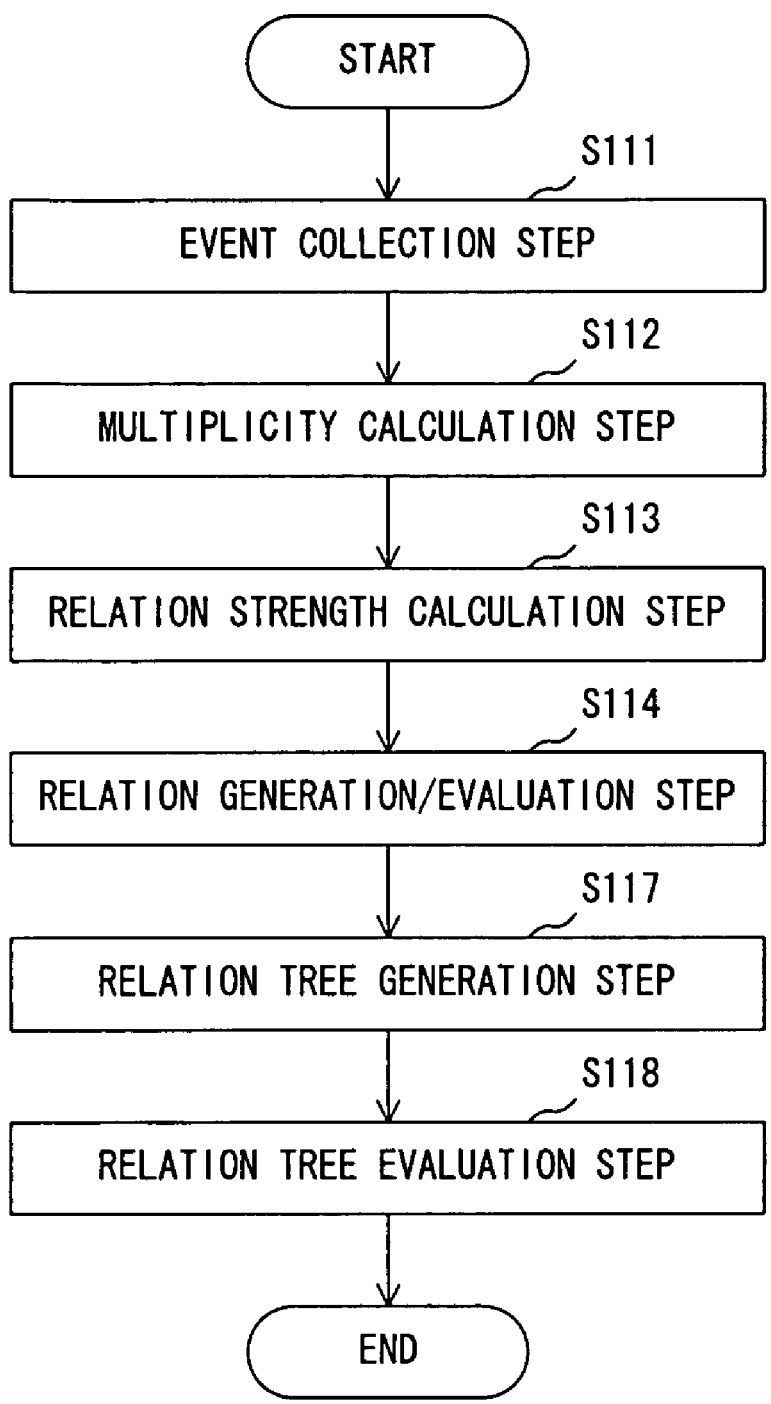
FIG. 2 is a flowchart showing an example of the operation of the database analysis apparatus according to the present embodiment.

FIG. 2 is a flowchart showing an example of the operation of the database analysis apparatus according to the present embodiment. The event collection section 71 performs an event collection step to collect an event from the plurality of DBs (S111). Then, the multiplicity calculation section 72 performs a multiplicity calculation step (field evaluation step) to calculate the multiplicity (field score) of each field (S112). Then, the relation strength calculation section 73 performs a relation strength calculation step to calculate the relation strength from a field of a given DB to one of another DB (S113).

Then, the relation generation section 74 performs a relation generation/evaluation step to generate a relation candidate from a field of a given DB to one of another DB as well as to calculate a relation score which is an evaluation indicator for the relation candidate (S114). Then, the relation tree generation section 77 performs a relation tree generation step to generate a relation tree candidate which is a candidate of a relation tree (relation structure) in which a plurality of relation candidates have been related to each other in a tree form (S117). Then, the relation tree evaluation section 78 performs a relation tree evaluation step to calculate a relation tree score (relation structure score) which is an evaluation indicator for the relation tree candidate and selects a relation tree from the relation tree candidates based on the calculated relation tree score so as to output it to the relation tree storage section 79 (S118), and this flow is then ended. The relation evaluation step corresponds to the relation strength calculation step and relation evaluation step in the embodiment.

The detail of the event collection step will next be described.

The event collection section 71 collects events from the order entry DB 80a, production DB 80b, arrangement DB 80c, and delivery DB 80d. FIG. 3 is a table showing an example of entries in the order entry DB 80a according to the present embodiment. The order entry DB 80a includes data fields such as date (event generation date), order number, region, charge. FIG. 4 is a table showing an example of entries in the production DB 80b according to the present embodiment. The production DB 80b includes data fields such as date (event generation date), production number, order number, article number, and delivery deadline. FIG. 5 is a table showing an example of entries in the arrangement DB 80c according to the present embodiment. The arrangement DB 80c includes data fields such as date (event generation date), arrangement number, order number, article number, and delivery destination. FIG. 6 is a table showing an example of entries in the delivery DB 80d according to the present embodiment. The delivery DB 80d includes data fields such as date (event generation date), arrangement number, delivery service number, and delivery destination. One record in the table of the order entry DB 80a, production DB 80b, arrangement DB 80c, or delivery DB 80d corresponds to one event.

The details of the multiplicity calculation step will next be described.

The multiplicity is a value calculated for each field. The smaller the appearance frequency of the same value is, the smaller the multiplicity becomes. The multiplicity calculation section 72 selects a given field in a given DB and counts the appearance frequency of each value in the selected field. Then, the multiplicity calculation section 72 calculates a multiplicity according to a first multiplicity calculation formula.

First multiplicity calculation formula:

$$\text{Multiplicity} = (\text{total sum of (appearance frequency}^2) \text{ of value of each event})/(\text{number of events})^2 \times 100.$$

Further, the multiplicity calculation section 72 calculates the multiplicity of all fields in all DBs. FIG. 7 is a table showing an example of the multiplicity calculation step according to the present embodiment. Here, results that the multiplicity calculation section 72 has obtained by counting the appearance frequencies for respective fields (production number, order number, article number, and delivery deadline) in the production DB 80b are shown. Based on these results, the multiplicity of production number and that of order number in the production DB 80b are calculated by the first multiplicity calculation formula as follows.

$$\text{Multiplicity of production number} =$$
$$(\text{appearance frequency of } S01^{\wedge}2 + \text{appearance frequency of } S02^{\wedge}2 +$$
$$\text{appearance frequency of } S03^{\wedge}2 + \text{appearance frequency}$$
$$\text{of } S04^{\wedge}2 + \text{appearance frequency of } S05^{\wedge}2 +$$
$$\text{appearance frequency of } S06^{\wedge}2)/(\text{number of events}^{\wedge}2) \times$$
$$100 = ((1^{\wedge}2) \times 6)/(6^{\wedge}2) \times 100 = 0.17 \times 100 = 17$$

$$\text{Multiplicity of order number} =$$
$$(\text{apperance frequency of } A01^{\wedge}2 + \text{appearance frequency of } A02^{\wedge}2 +$$
$$\text{appearance frequency of } A03^{\wedge}2 +$$
$$\text{appearance frequency of } A04^{\wedge}2)/(\text{number of events}^{\wedge}2) \times$$
$$100 = ((2^{\wedge}2) \times 2 + (1^{\wedge}2) \times 2)/(6^{\wedge}2) \times 100 = 0.28 \times 100 = 28$$

Another example of the multiplicity calculation formula will next be described.

Second multiplicity calculation formula:

$$\text{Multiplicity} = \text{total sum of} -((\text{appearance frequency}) \times \log 2(\text{appearance frequency})) \text{ of each event value}$$

Using the second multiplicity calculation formula, the multiplicity of production number and that of order number in the production DB 80b are calculated as follows in the example shown in FIG. 7.

Multiplicity of production number =

$-($appearance frequency of $S01 \times \log 2$ (appearance frequency of $S01$) + appearance frequency of $S02 \times \log 2$ (appearance frequency of $S02$) + appearance frequency of $S03 \times \log 2$ (appearance frequency of $S03$) + appearance frequency of $S04 \times \log 2$ (appearance frequency of $S04$) + appearance frequency of $S05 \times \log 2$(appearance frequency of $S05$) + appearance frequency of $S06 \times \log 2$ (appearance frequency of $S06$)) = $-6 \times (1 \times \log(1)) = 0$ Muliplicity of order number = $-$(appearance frequency of $A01 \times \log 2$ (appearance frequency of $A01$) + appearance frequency of $A02 \times \log 2$ (appearance frequency of $A02$) + appearance frequency of $A03 \times \log 2$ (appearance frequency of $A03$) + appearance frequency of $A04 \times \log 2$ (appearance frequency of $A04$)) =

$-(2 \times 2 \times \log(2) + 2 \times 1 \times \log(1)) = -4$

Third multiplicity calculation formula:

Multiplicity=total sum of $-$((appearance frequency/ number of events)$\times$log(appearance frequency/ number of events) of each event value Using the third multiplicity calculation formula, the multiplicity of production number and that of order number in the production DB 80b are calculated as follows in the example shown in FIG. 7.

Multiplicity of production number =

$-($appearance number of $S01$/number of events $\times \log 2$ (appearance number of $S01$/number of events) + appearance number of $S02$/number of events $\times \log 2$ (appearance number of $S02$/number of events) + appearance number of $S03$/number of events $\times \log 2$ (appearance number of $S03$/number of events) + appearance number of $S04$/number of events $\times \log 2$ (appearance number of $S04$/number of events) + appearance number of $S05$/number of events $\times \log$ $2$(appearance number of $S05$/number of events) + appearance number of $S06$/number of events $\times \log 2$ (appearance number of $S06$/number of events)) =

$-6 \times (1/6 \times \log(1/6)) = 2.58$

Multiplicity of order number =

$-($appearance number of $A01$/number of events $\times \log$ $2$(appearance number of $A01$/number of events) +

(appearance number of $A02$/number of events $\times \log 2$ (appearance number of $A02$/number of events) +

(appearance number of $A03$/number of events $\times \log 2$ (appearance number of $A03$/number of events) +

(appearance number of $A04$/number of events $\times \log$ $2$(appearance number of $A04$/number of events)) =

$-(2 \times (2/6 \times \log(2/6)) + 2 \times (1/6 \times \log(1/6))) = 1.92$

A use of the above multiplicity values allows detecting of a relation from a field having a low multiplicity, using a field having a low multiplicity as a key, and the like.

The detail of the relation strength calculation step will next be described.

In the following relation generation step, the relation generation section 74 sets a given DB as a relation source DB, sets a given field in the relation source DB as a relation source field, sets a given DB different from the relation source DB as a relation destination DB, and sets a given field in the relation destination DB as a relation destination field. In the relation strength calculation step, the relation strength calculation section 73 calculates the relation strength from the relation source field to relation destination field, the value being used in the relation generation step.

The relation strength is calculated for each combination of a relation source field and relation destination field. A relation strength of 1 means that there is a one to one correspondence between values of the relation source field and those of the relation destination field. As the relation strength is reduced from 1, the number of values in the relation destination field that correspond to values in the relation source field becomes smaller. As the relation strength is increased from 1, the multiplicity of the values in the source destination field relative to the relation source field becomes larger.

Figure 8:
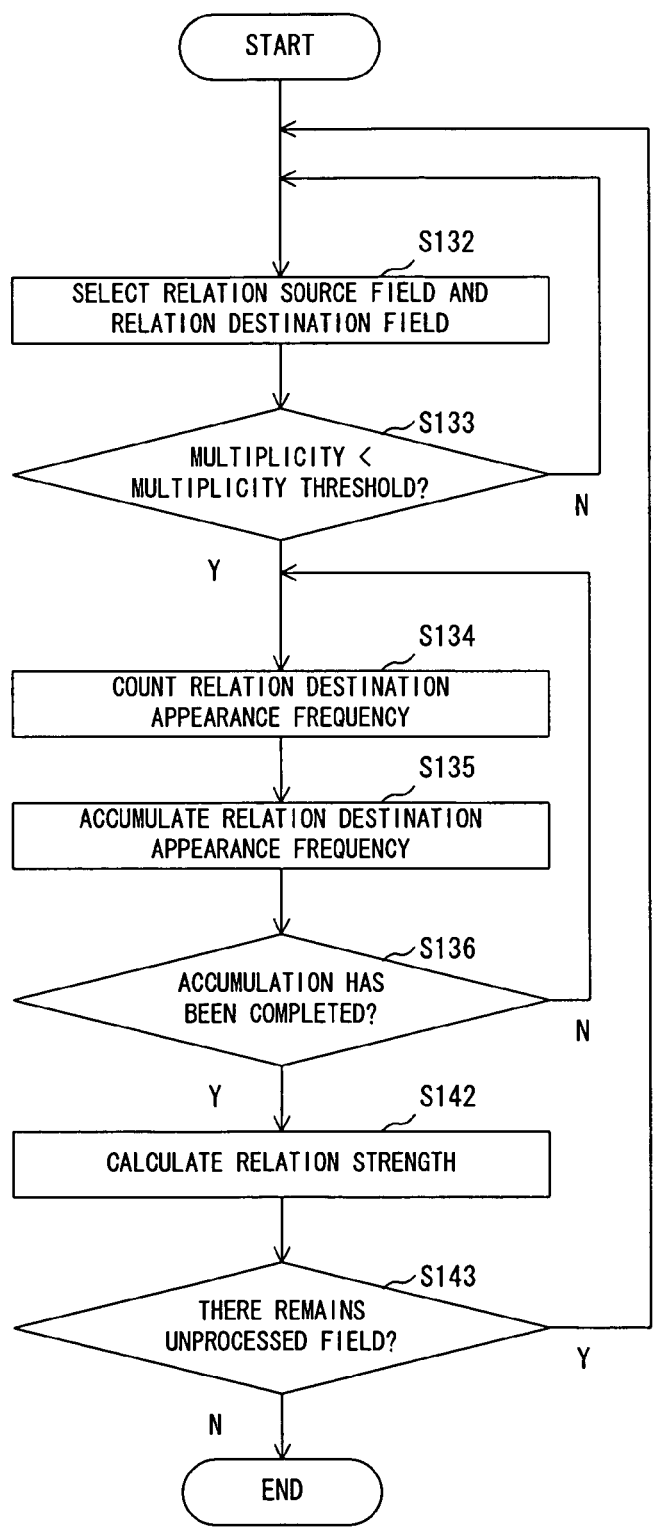
FIG. 8 is a flowchart showing an example of the operation of a relation strength calculation step according to the present embodiment.

FIG. 8 is a flowchart showing an example of the operation of the relation strength calculation step according to the present embodiment. Firstly, the relation strength calculation section 73 selects a relation source DB and relation destination DB from all DBs, selects a relation source field from the selected relation source DB, and selects a relation destination field from the selected relation destination DB (S132). Then, the relation strength calculation section 73 determines whether the multiplicity of the relation source field is less than a predetermined multiplicity threshold (S133). It is assumed here that the multiplicity threshold is 30 in the case of using the first multiplicity calculation formula.

If the multiplicity is not less than the multiplicity threshold (N in S133), the flow returns to step S131 where the relation strength calculation section 73 selects the next pair of the relation source field and relation destination field. If the multiplicity is less than the multiplicity threshold (Y in S133), the relation strength calculation section 73 counts the appearance frequency of values in the relation destination field for each relation source field and sets the count result as "relation destination appearance frequency" (S134). Then, the relation strength calculation section 73 accumulates the relation destination appearance frequency and sets the accumulation result as "accumulated appearance frequency" (S135). After that, the relation strength calculation section 73 determines whether the accumulation of all values has been completed for the relation source field or not (S136).

If the accumulation has not been completed (N in S136), the flow returns to step S134 where the relation strength calculation section 73 performs the accumulation processing for the next value. If the accumulation has been completed (Y in S136), the relation strength calculation section 73 divides the accumulated appearance frequency by the number of events in the relation source field and sets the division result as the relation strength from the relation source field to relation destination field (S142). Then, the relation strength calculation section 73 determines whether there remains any field that has not been processed as a calculation target (S143). If there is any field that has not been processed (Y in S143), the flow returns to step S131 where the relation strength calculation section 73 selects the next DB and field therein as the calculation target. If all the DBs and fields therein have been processed as the calculation target (N in S143), this flow is ended.

That is, the relation strength from the relation source field to relation destination field is calculated according to the following relation strength calculation formula.

Relation strength from relation source field to relation destination field=(total sum of relation destination appearance frequency of values for each event of relation source field)/(number of events in relation source field)

FIG. 9 is a table showing a first example of the relation strength calculation step according to the present embodiment. In this example, the order entry DB 80*a* is set as the relation source DB, and the production DB 80*b* is set as the relation destination DB. Further, order number in the order entry DB 80*a* is set as the relation source field, and order number in the production DB 80*b* is set as the relation destination field. In the table of FIG. 9, each arrow going from a value of order number in the order entry DB 80*a* to a value of order number in the production DB 80*b* represents that the relevant values correspond to each other. Further, the table shows the relation source appearance frequency and relation destination appearance frequency for each relation source field value. The relation strength from order number in the order entry DB 80*a* to order number in the production DB 80*b* is calculated as follows.

Relation strength from order number in order entry $DB$ 80$a$ to order number in production $DB$ 80$b$ = $(1 \times 2 + 1 \times 1 + 1 \times 2 + 1 \times 1)/4 = 1.5$ FIG. 10 is a table showing a second example of the relation strength calculation step according to the present embodiment. In this example, the order entry DB 80*a* is set as the relation destination DB, and the production DB 80*b* is set as the relation source DB. Further, order number in the order entry DB 80*a* is set as the relation destination field, and order number in the production DB 80*b* is set as the relation source field. In the table of FIG. 10, each arrow going from a value of order number in the production DB 80*b* to a value of order number in the order entry DB 80*a* represents that the relevant values correspond to each other. Further, the table shows the relation source appearance frequency and relation destination appearance frequency for each relation source field value. The relation strength is calculated as follows.

Relation strength from order number in production $DB$ 80$b$ to order number in order entry $DB$ 80$a$ =

(total sum of (relation source appearance frequency× relation destination appearance frequency)

of values for each event of relation source field)/

(number of events in relation source field) =

$(2 \times 1 + 1 \times 1 + 2 \times 1 + 1 \times 1)/6 = 1$

A use of the above relation strength values allows determination of whether the relation between the relation source field and relation destination field is close to one to one correspondence or not.

The detail of the relation generation/evaluation step will next be described.

A relation is represented by a combination of a key field of the relation source DB, relation source field in the relation source DB, and relation destination field in the relation destination DB.

Figure 11:
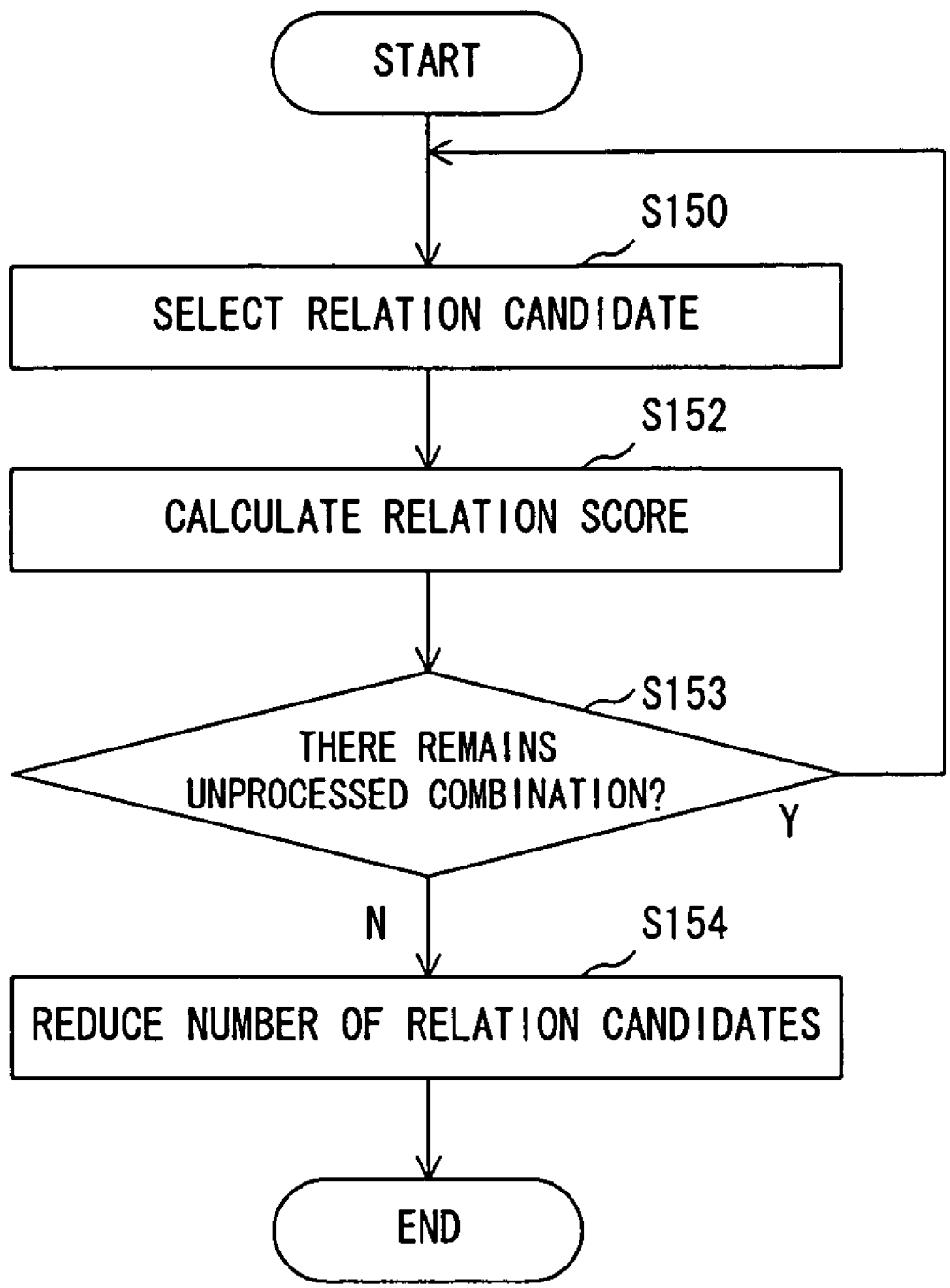
FIG. 11 is a flowchart showing an example of the operation of a relation generation/evaluation step according to the present embodiment.

FIG. 11 is a flowchart showing an example of the operation of the relation generation/evaluation step according to the present embodiment. Firstly, the relation generation section 74 selects a combination of the key field, relation source field, and relation destination field as a relation candidate (S150) (relation generation step). Then, the relation evaluation section 75 calculates the relation score of the relation candidate using a relation score calculation formula to be described later (S152) (relation evaluation step). The relation score represents the probability of the combination of the key field, relation source field, and relation destination field as the relation candidate. Then, the relation generation section 74 determines whether there remains any combination that has not been set as the relation candidate (S153). If there is any combination that has not been set as the relation candidate (Y in S153), the flow returns to step S150 where the relation generation section 74 selects the next combination. If there is no combination to be selected as the relation candidate (N in S153), the relation evaluation section 75 selects the relation candidates for each relation source DB in the descending order of the relation score thereof to reduce the number of candidates to a predetermined number (S154), and this flow is then ended.

The calculation of the relation score for each relation candidate in the relation generation/evaluation step allows a use of a probable relation candidate. Further, by narrowing down the relation candidates based on the relation score, the time required for the subsequent processing can be reduced.

The detail of the relation tree generation step will next be described.

It is assumed here that the relation is represented as a connection between two nodes, and that the relation source DB is set as a relation source node and relation destination DB is set as a relation destination node. A relation tree has a tree-like form in which a plurality of relations are connected to one another by a common node. Here, it is assumed that the relation destination node is a parent and relation source node is a child.

Figure 12:
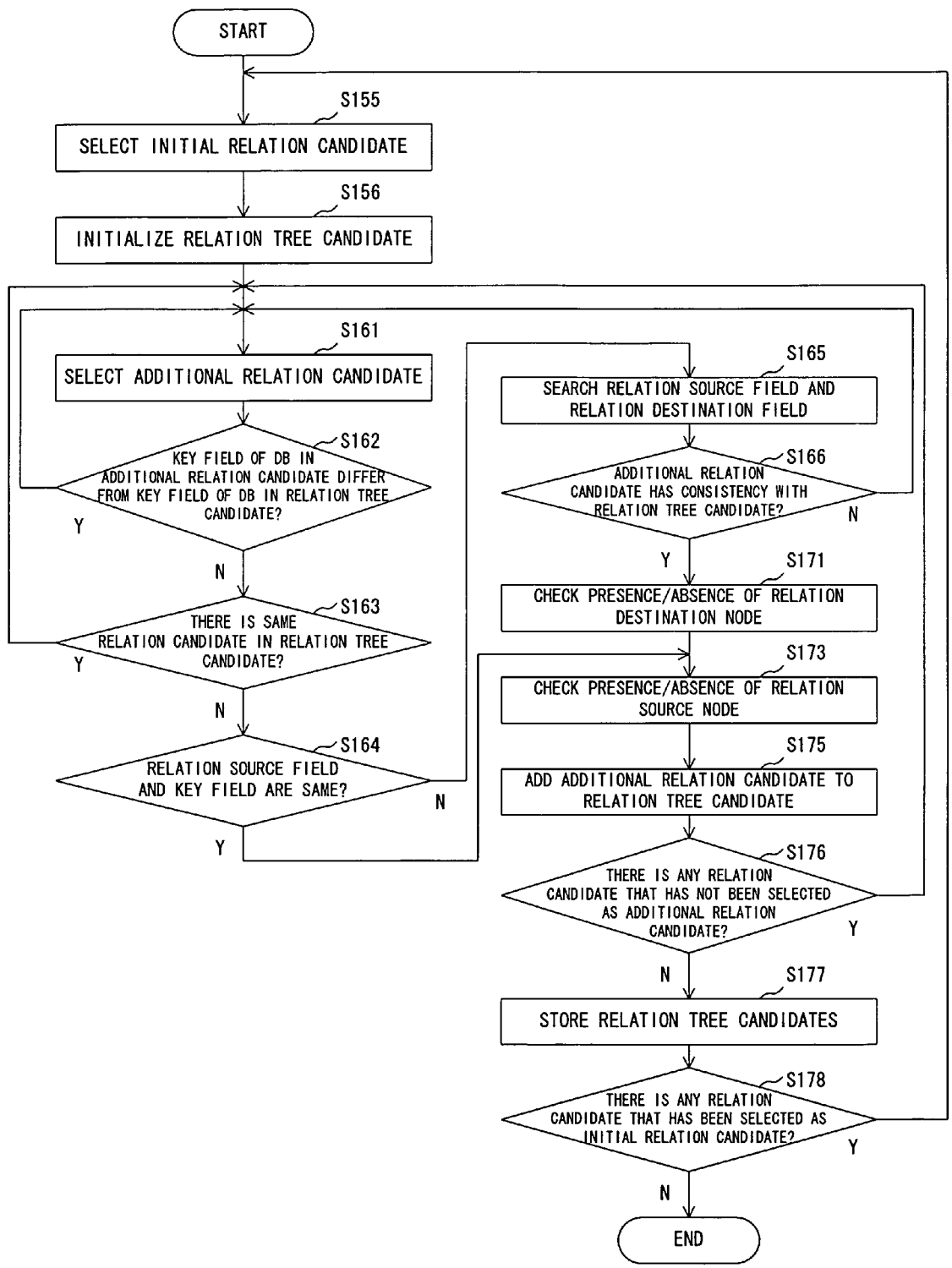
FIG. 12 is a flowchart showing an example of the operation of a relation tree generation step according to the present embodiment.

FIG. 12 is a flowchart showing an example of the operation of the relation tree generation step according to the present embodiment. Firstly, the relation tree generation section 77 selects one from the selected relation candidates as an initial relation candidate (S155) and sets the initial relation candidate as the initial state of a relation tree candidate (S156). The relation source DB and relation destination DB in the initial relation candidate are set as nodes of the relation tree candidate. Then, the relation tree generation section 77 selects one from the relation candidates as an additional relation candidate (S161).

Then, if a DB in the additional relation candidate exists as a DB in the relation tree candidate, and the key fields of the two differ from each other (Y in S162), the flow returns to step S161 where the relation tree generation section 77 selects the next additional relation candidate. If a DB in the additional relation candidate exists as a DB in the relation tree candidate, and the key fields of the two correspond to each other, or if a DB in the additional relation candidate does not exist as a DB in the relation tree candidate (N in S162), the relation tree generation section 77 determines whether there is the same relation candidate as the additional relation candidate in the relation tree candidate (S163).

If the same relation candidate exists in the relation tree candidate (Y in S163), the flow returns to step S161 where the relation tree generation section 77 selects the next additional relation candidate. If the same relation candidate does not exist in the relation tree candidate (N in S163), the relation tree generation section 77 determines whether the relation source field and key field in the additional relation candidate are the same field (S164). If they are the same field (Y in S164), the flow shifts to step S173. If they are not the same field (N in S164), the relation tree generation section 77 searches the relation tree candidate for the relation source field and relation destination field (S165) and determines whether the additional relation candidate has a consistency with the relation tree candidate (S166). Note that the relation tree generation section 77 determines that the additional relation candidate has a consistency with the relation tree candidate if a predetermined relation tree rule is satisfied.

If the additional relation candidate does not have a consistency with the relation tree candidate (N in S166), the flow returns to step S161 where the relation tree generation section 77 selects the next additional relation candidate. If the additional relation candidate has a consistency with the relation tree candidate (Y in S166), the relation tree generation section 77 creates, in the relation tree candidate, a node corresponding to a relation destination DB in the additional relation candidate, if not exist (S171).

Then the relation tree generation section 77 creates, in the relation tree candidate, a node corresponding to a relation source DB in the additional relation candidate, if not exist (S173). Then, the relation tree generation section 77 adds the additional relation candidate to corresponding two nodes in the relation tree candidate (S175). Note that nodes having the same key field in the relation tree candidate are grouped into one node.

Then, the relation tree generation section 77 determines whether there is any relation candidate that has not been selected as the additional relation candidate (S176). If there is any relation candidate that has not been selected as the additional relation candidate (Y in S176), the flow returns to step S161 where the relation tree generation section 77 selects the next additional relation candidate. If there is no relation candidate that has not been selected as the additional relation candidate (N in S176), the relation tree evaluation section 78 calculates the sum of relation scores of the relation candidates constituting the relation tree candidate to obtain a relation tree score, and the relation tree generation section 77 stores the relation tree candidates and the relation tree score (S177).

Then, the relation tree generation section 77 determines whether there is any relation candidate that has not been selected as the initial relation candidate (S178). If there is any relation candidate that has not been selected as the additional relation candidate (Y in S178), the flow returns to step S155 where the relation tree generation section 77 selects the next initial relation candidate. If there is no relation candidate that has not been selected as the initial relation candidate (N in S178), this flow is ended.

The above relation tree generation step allows connection of adequate relation candidates so as to generate a relation tree candidate.

The detail of the relation tree rule used in step S166 will next be described.

Figure 13:
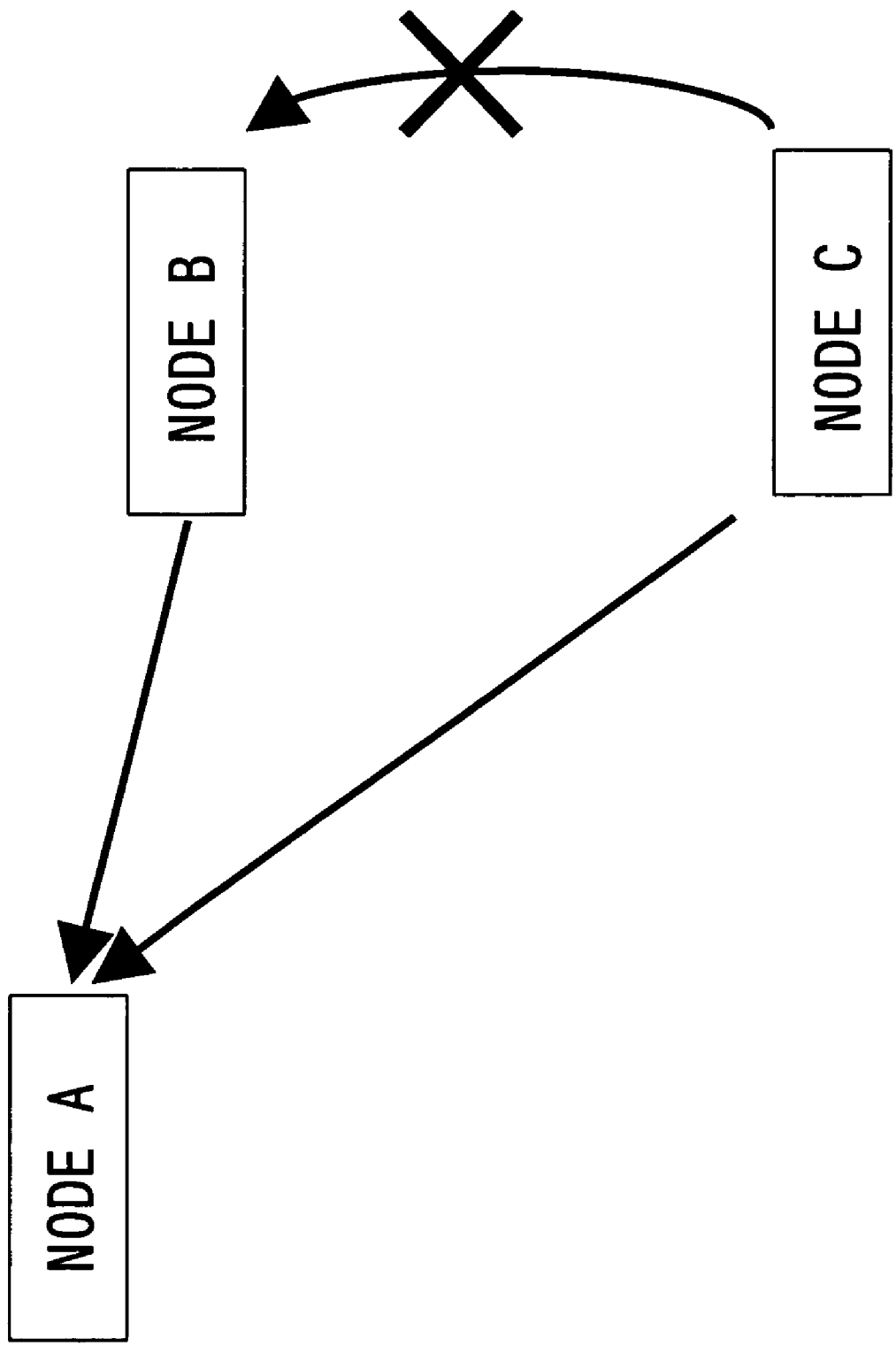
FIG. 13 is a view showing an example of a first relation tree rule according to the present embodiment.

A first relation tree rule is "relation between nodes having the same parent (node of relation destination DB) is not permitted". FIG. 13 is a view showing an example of the first relation tree rule according to the present embodiment. There exists a relation from a node B to node A, in which the node B is a relation source DB and node A is a relation destination DB. There also exists a relation from a node C to node A, in which the node c is a relation source DB and node A is a relation destination DB. That is, since the nodes B and c have the same relation destination (node A), a relation between the nodes B and C is not permitted.

Figure 14:
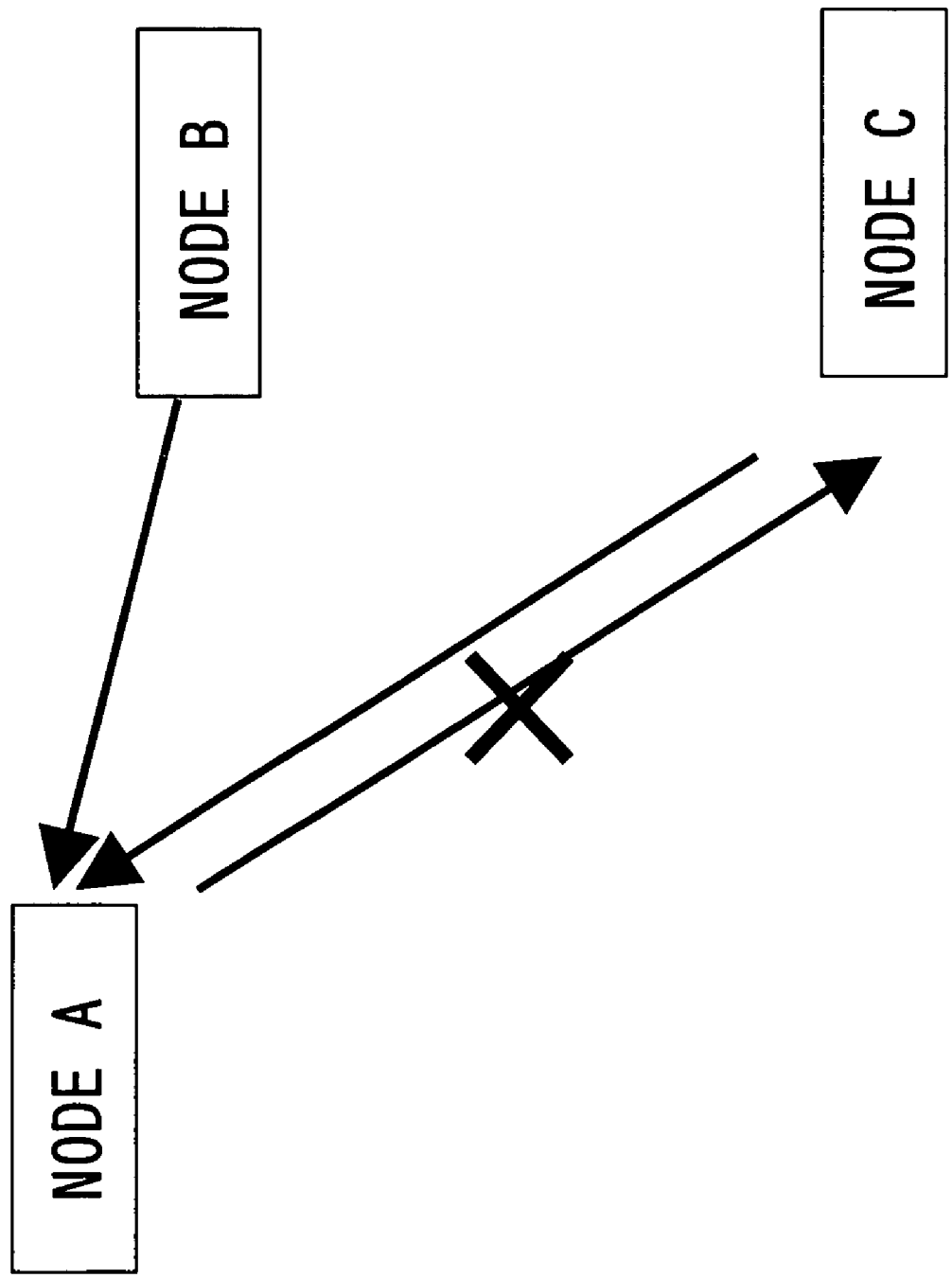
FIG. 14 is a view showing an example of a second relation tree rule according to the present embodiment.

A second relation tree rule is "opposite relation to a relation that has already existed is not permitted". FIG. 14 is a view showing an example of a second relation tree rule according to the present embodiment. There is a relation from a node C to node A, in which the node C is a relation source DB and node A is a relation destination DB. Therefore, a relation in which the node A is set as a relation source DB and node C is set as a relation destination DB is not permitted.

By applying the above relation tree rules, processing time required for generating the relation tree candidate can be reduced.

Figure 15:
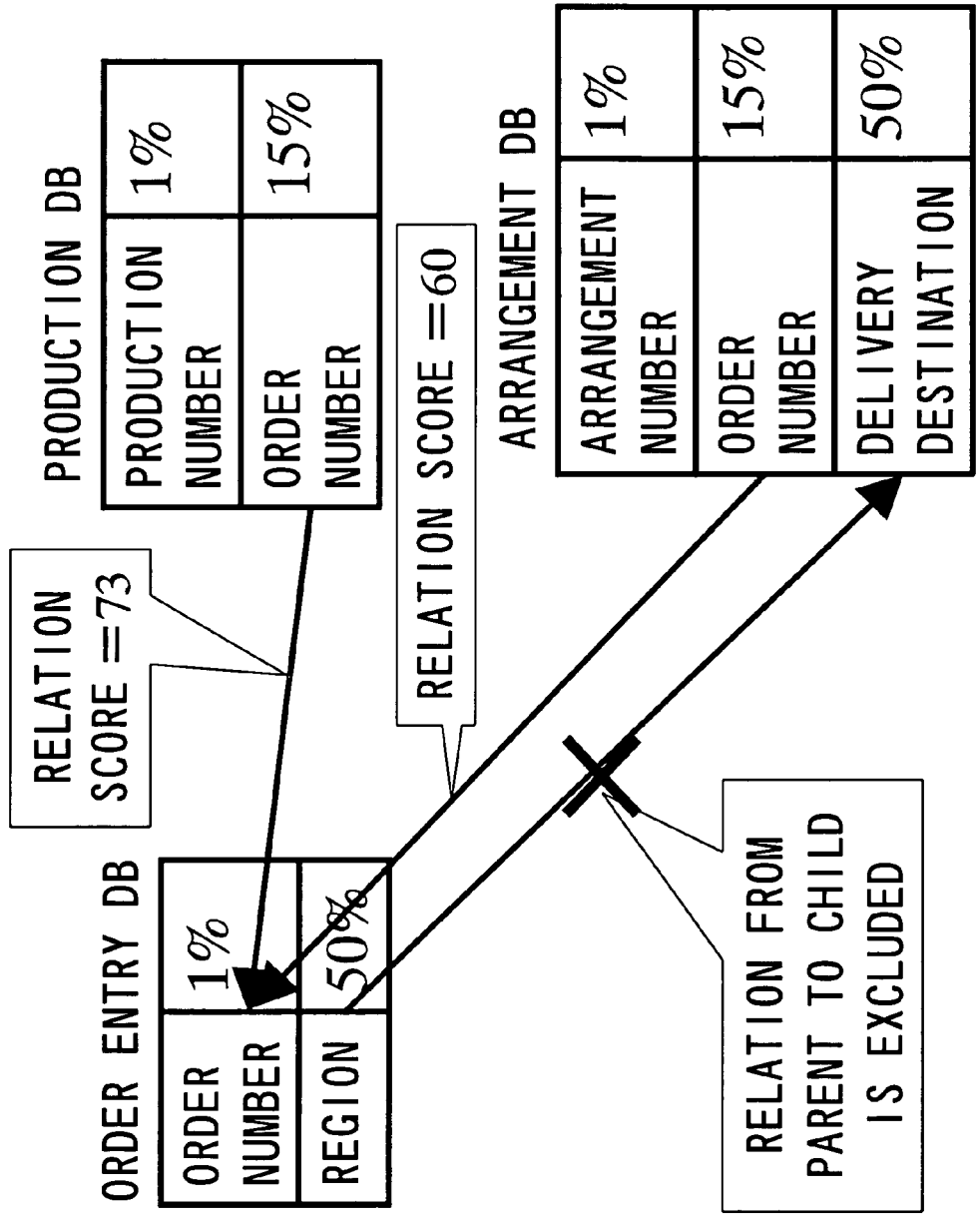
FIG. 15 is a view showing a first example of the relation tree generation step according to the present embodiment.

FIG. 15 is a view showing a first example of the relation tree generation step according to the present embodiment. In this relation tree candidate, the order entry DB 80*a* is a node A, production DB 80*b* is a node B, and arrangement DB 80*c* is a node C. There exists a relation candidate from the node B (child) to node A (parent) in which the relation source field is order number in the production DB 80*b* and relation destination field is order number in the order entry DB 80*a*. Further, there exists another relation candidate from the node C to node A in which the relation source field is order number in the arrangement DB 80*c* and relation destination field is order number in the order entry DB 80*a*.

Here, there exists still another relation candidate from the node A to node C in which the relation source field is region in the order entry DB 80*a* and relation destination field is delivery destination in the arrangement DB 80*c*. However, according to the second relation tree rule, addition of this relation candidate to the relation tree candidate is not permitted.

Figure 16:
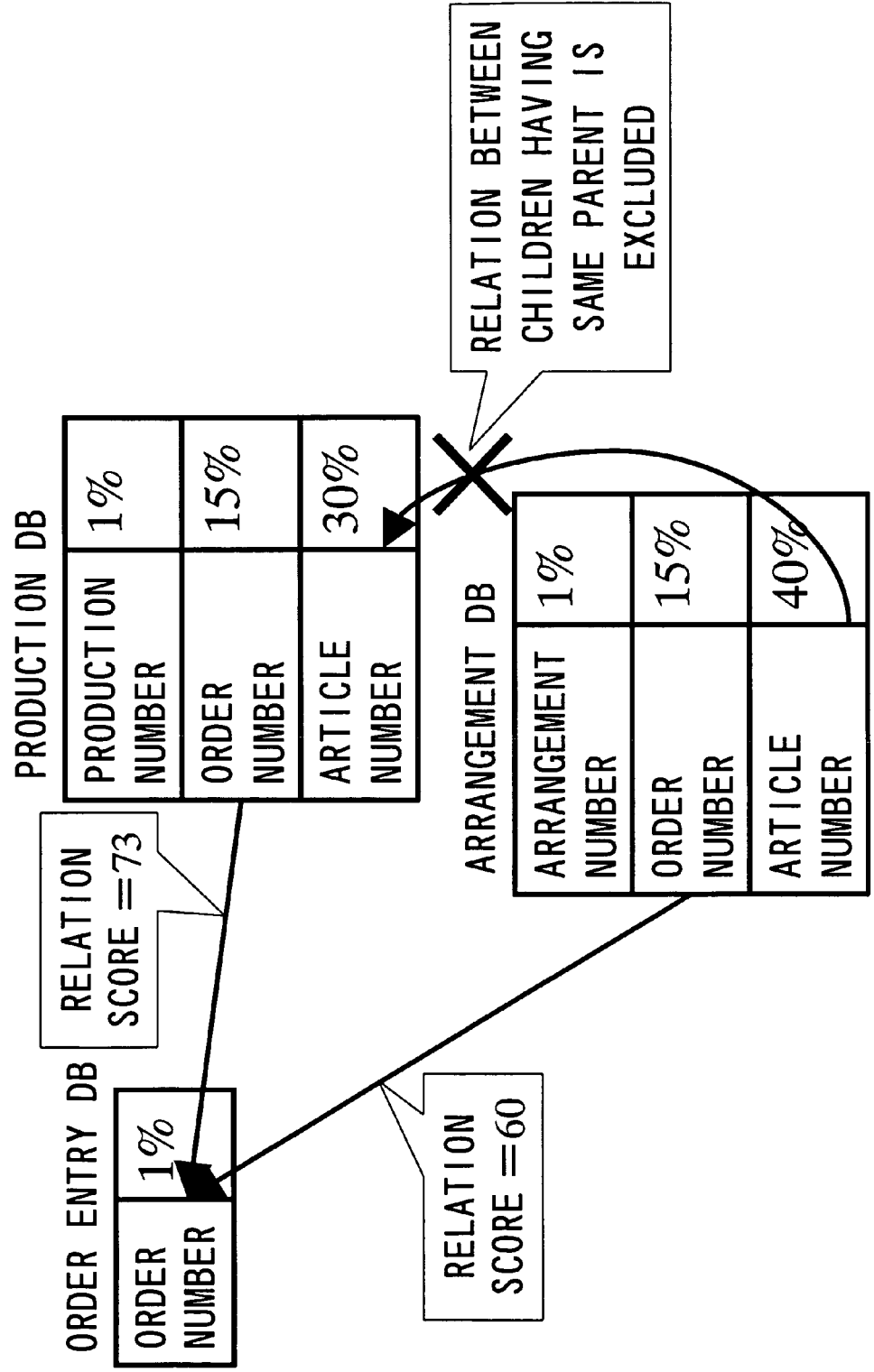
FIG. 16 is a view showing a second example of the relation tree generation step according to the present embodiment.

FIG. 16 is a view showing a second example of the relation tree generation step according to the present embodiment. In this relation tree candidate, the order entry DB 80*a* is a node A, production DB is a node B, and arrangement DB 80*c* is a node C. There exists a relation candidate from the node B to node A in which the relation source field is order number in the production DB 80*b* and relation destination field is order number in the order entry DB 80*a*. Further, there exists another relation candidate from the node C to node A in which the relation source field is order number in the arrangement DB 80*c* and relation destination field is order number in the order entry DB 80*a*.

Here, there exists still another relation candidate from the node C to node B in which the relation source field is article number in the arrangement DB 80*c* and relation destination field is article number in the production DB 80*b*. However, according to the first relation tree rule, addition of this relation candidate to the relation tree candidate is not permitted.

Figure 17:
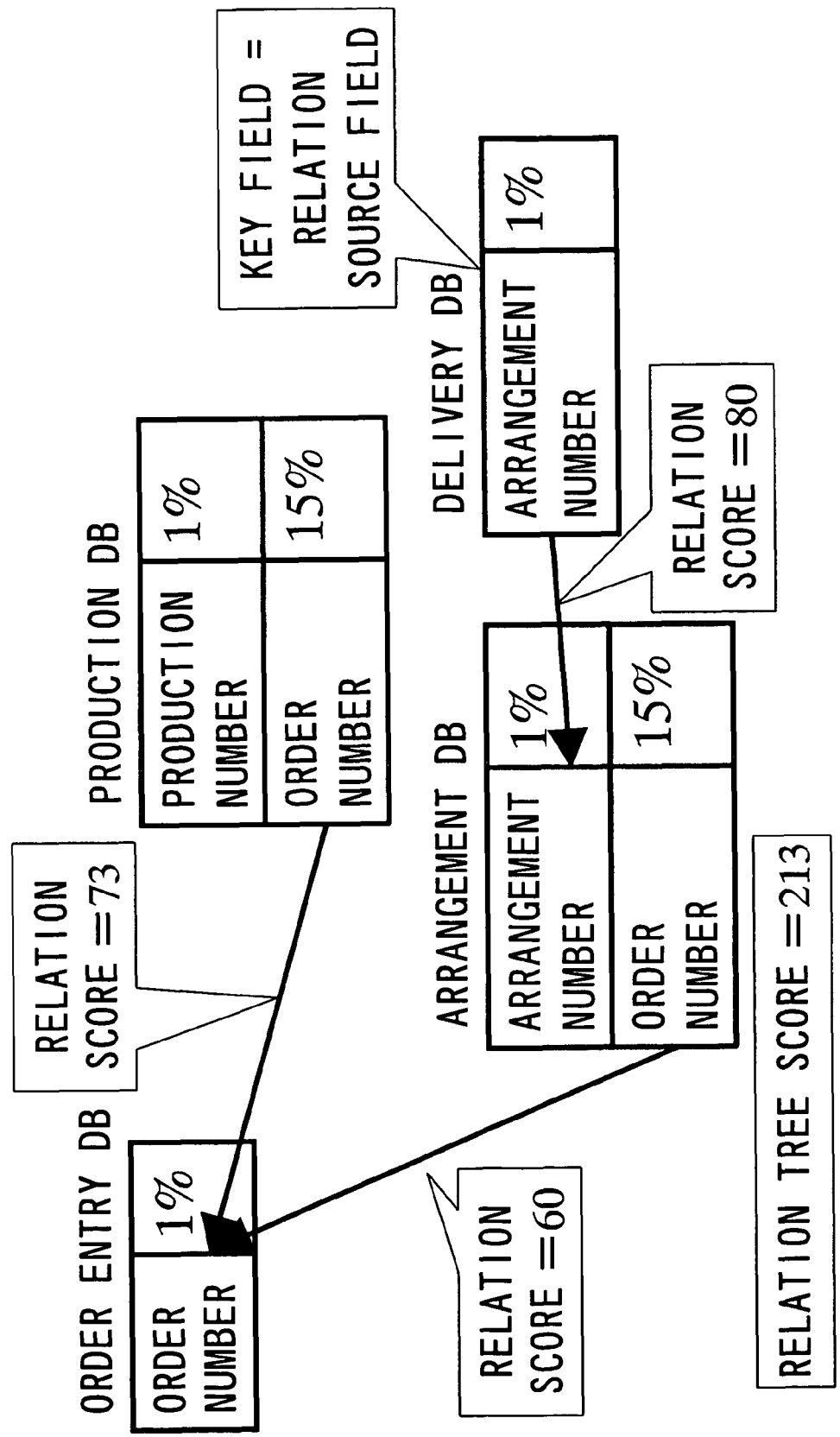
FIG. 17 is a view showing a third example of the relation tree generation step according to the present embodiment.

FIG. 17 is a view showing a third example of the relation tree generation step according to the present embodiment. In this relation tree candidate, the order entry DB 80*a* is a node A, production DB 80*b* is a node B, arrangement DB 80*c* is a node C, and delivery DB 80*d* is a node D. There exists a relation candidate from the node B to node A in which the relation source field is order number in the production DB 80*b* and relation destination field is order number in the order entry DB 80*a*. Further, there exists another relation candidate from the node C to node A in which the relation source field is order number in the arrangement DB 80*c* and relation destination field is order number in the order entry DB 80*a*. Further, there exists still another relation candidate from the node D to node C in which the key field and relation source field is arrangement number in the delivery DB 80*d* and relation destination field is arrangement number in the arrangement DB 80*c*.

The relation score of the relation candidate from the node B to node A is 73, that of the relation candidate from the node C to node A is 60, and that of the relation candidate from the node D to node C is 80. Accordingly, the relation tree score of the relation tree candidate shown in FIG. 17 is 213.

Operation of the relation tree evaluation step will next be described.

The relation tree evaluation section 78 displays the relation tree candidates in the descending order of the relation tree score thereof. When one relation candidate is selected on a screen that displays the relation tree candidates by a user or the like, the relation tree evaluation section 78 displays, with respect to the selected relation candidate, values of the key field, relation source field, relation destination field, and arrows each indicating a correspondence between the relation source field and relation destination field.

Figure 18:
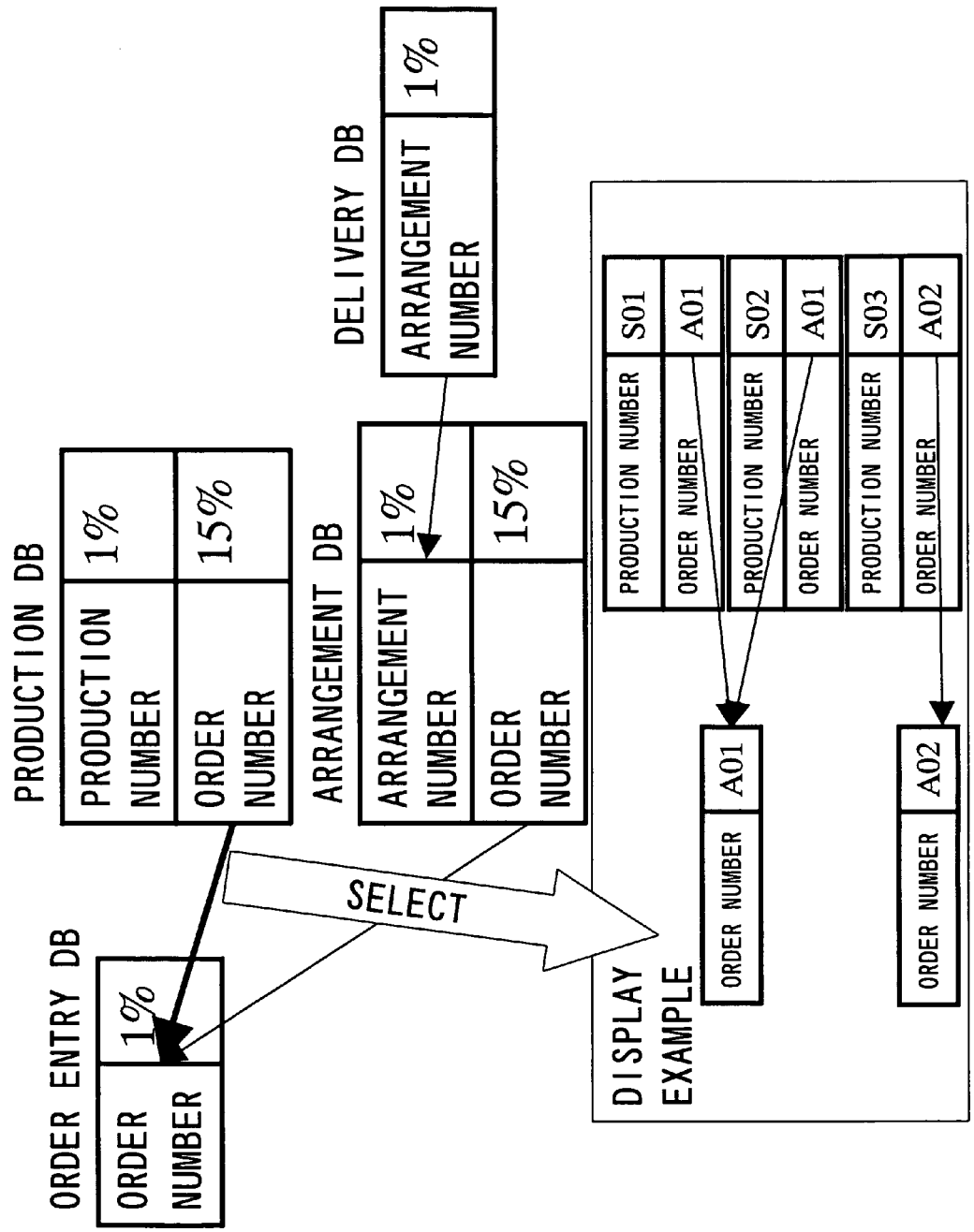
FIG. 18 is a view showing a screen that displays a first example of content in a relation tree evaluation step according to the present embodiment.

FIG. 18 is a view showing a screen that displays a first example of content in the relation tree evaluation step according to the present embodiment. In this example, the relation tree evaluation section 78 firstly displays the relation tree candidate shown in FIG. 17. Then, when an arrow indicating a relation candidate from a node B to node A is selected by the user, the relation tree evaluation section 78 displays, with respect to the selected relation candidate, values of production number (key field) in the production DB 80*b*, values of order number (relation source field) in the production DB 80*b* each of which is included in the same event as the value of production number, values of order number (relation destination field) in the order entry DB 80*a* each of which corresponds to the value of order number in the production DB 80*b*, and arrows each indicating a correspondence between the values of relation source field and relation destination field.

Figure 19:
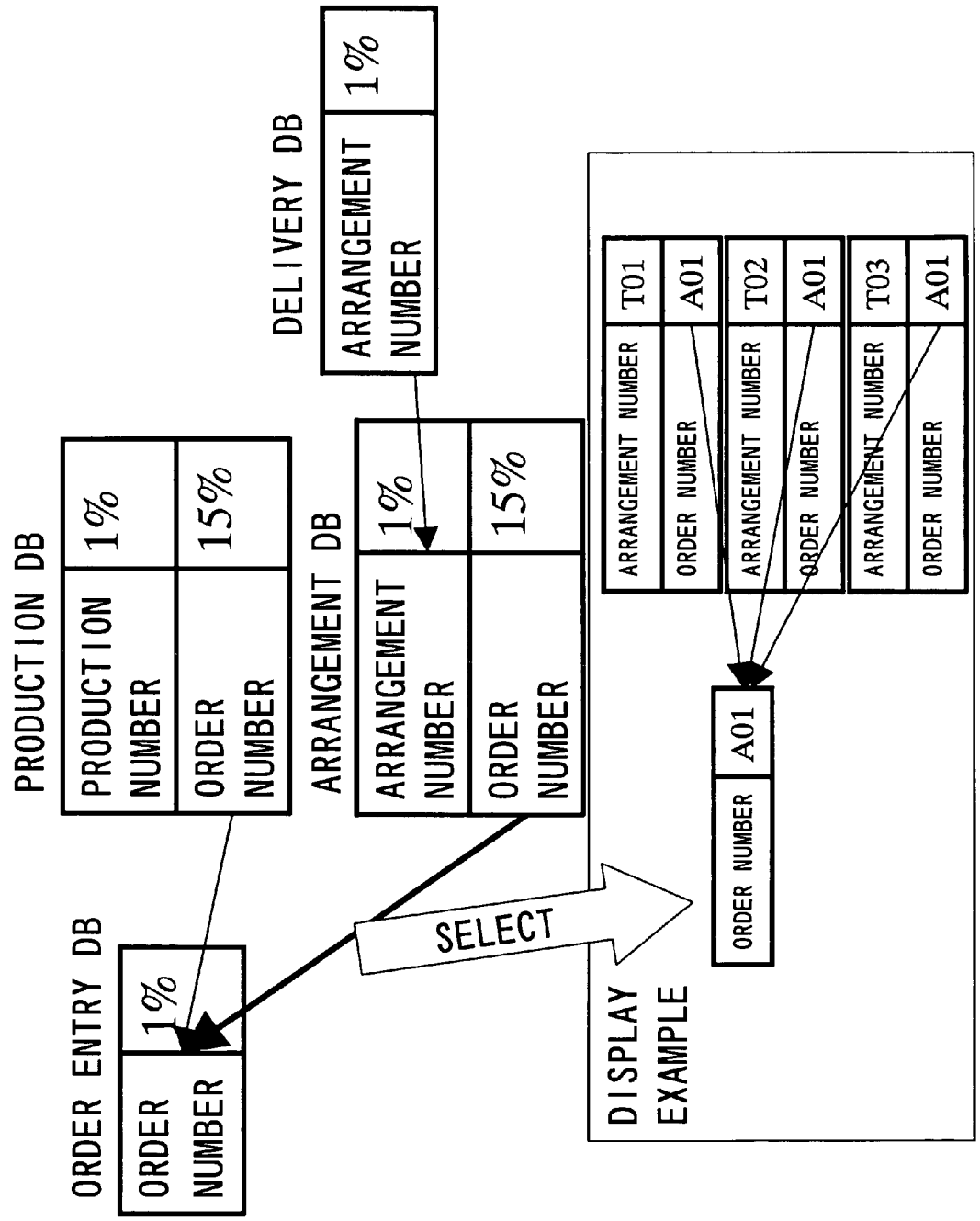
FIG. 19 is a view showing a screen that displays a second example of content in the relation tree evaluation step according to the present embodiment.

FIG. 19 is a view showing a screen that displays a second example of content in the relation tree evaluation step according to the present embodiment. In this example, the relation tree evaluation section 78 firstly displays the relation tree candidate shown in FIG. 17. Then, when an arrow indicating a relation candidate from a node C to node A is selected by the user, the relation tree evaluation section 78 displays, with respect to the selected relation candidate, values of arrangement number (key field) in the arrangement DB 80*c*, values of order number (relation source field) in the arrangement DB 80*c* each of which is included in the same event as the value of arrangement number, values of order number (relation destination field) in the order entry DB 80*a* each of which corresponds to the value of order number in the arrangement DB 80*c*, and arrows each indicating a correspondence between the values of relation source field and relation destination field.

The above display operation allows the user to visually confirm the relation tree candidate and, in particular, concrete values included in the relation candidate in the relation tree candidate. This allows the user to determine whether the specified relation candidate is an appropriate one.

Then, the relation tree evaluation section 78 selects a relation tree candidate that has the highest relation tree score as a relation tree and outputs it to the relation tree storage section 79.

The relation tree evaluation section 78 may require the user to confirm the appropriateness of the relation tree candidate displayed by the relation tree candidate display processing. In this case, when the user confirms that a given relation tree candidate is an appropriate one by referring to the relation tree candidate and values of the relation source field, key field, and relation destination field in the relation tree candidate, the relation tree evaluation section 78 selects the relation tree candidate as a relation tree.

The relation tree evaluation step allows the relation tree candidate having the highest relation tree score or relation tree candidate that the user has regarded as an appropriate one to be output as a relation tree. As a result, a reliable relation tree can be obtained.

According to the present embodiment, it is possible to determine a relation among a plurality of databases based on data included in the databases and visualize the relation without a use of schema information of each DB or business knowledge.

Applying the present invention to a business tracking apparatus like abovementioned Patent Document allows automatic execution of the tracking of a business process in which a plurality of DBs has needed to be related to one another by a user himself. Further, applying the present invention to a BPM (Business Process Management) tool allows automatic execution of creation or restoration of a BPM model whose description has needed to be made by a user himself.

Although the relation tree rule is used to generate the relation tree in the present embodiment, another rule may be used to generate a relation structure other than one having the tree-like form. Further, although the database analysis apparatus according to the present embodiment outputs a relation tree including a plurality of relations based on the relation tree score or user's selection, only a single relation may be output based on the relation tree score or user's selection.

The database analysis apparatus according to the present embodiment can easily be applied to an information processor to thereby enhance the performance thereof. Examples of the information processor include a server and a PC (Personal Computer), and the like.

Further, it is possible to provide a program that allows a computer constituting the database analysis apparatus to execute the above steps as a database analysis program. By storing the above program in a computer-readable storage medium, it is possible to allow the computer constituting the database analysis apparatus to execute the program. The computer-readable medium mentioned here includes: an internal storage device mounted in a computer, such as ROM or RAM, a portable storage medium such as a CD-ROM, a flexible disk, a DVD disk, a magneto-optical disk, or an IC card; a database that holds computer program; and another computer and database thereof.

What is claimed is:

1. A computer-readable storage medium that contains therein a program causing a computer to execute a process comprising:

collecting a plurality of tables from a storage;

calculating, for each field of each of the plurality of tables, a field score which is a value based on the appearance frequency of each value in the field;

selecting tables different from each other as a relation source table and a relation destination table from the plurality of tables, the relation source table having a field different from each of fields in the relation destination table, selecting a relation source field which is a field in the relation source table and a relation destination field which is a field in the relation destination table, and generating a combination of the relation source field and the relation destination field as a relation; and calculating, for each relation generated, a relation strength from the relation source field to the relation destination field based on the appearance frequency of each value in the relation destination field duplicated in each relation source field, the relation strength indicating correspondence between values in the relation source field and values in the relation destination field, and calculating a relation score which is a value based on the relation strength thus calculated, a field score of the relation source field, and a field score of the relation destination field.

2. The computer-readable storage medium according to claim 1, wherein the selecting selects a key field which is a field in the relation source table and generates a combination of the relation source field, the relation destination field, and the key field as a relation, and the calculating calculates a relation score of the relation generated by the selecting, the relation score being a value based on the appearance frequency of each value in the relation destination field duplicated in each relation source field, the field score of the relation source field, the field score of the relation destination field, and a field score of the key field.

3. The computer-readable storage medium according to claim 1, wherein the smaller the appearance frequency of each value in the field is, the smaller the field score thereof becomes, and the selecting selects the relation source field from a field whose field score is smaller than a predetermined field score threshold.

4. The computer-readable storage medium according to claim 1, wherein the closer the appearance frequency of each value in the relation destination field duplicated in each relation source field is to 1, the larger the relation score becomes, and the smaller the field score for each field included in the relation and the field score of the key field are, the larger the relation score becomes, and the calculating selects a predetermined number of relations in the descending order of the relation score thereof.

5. The computer-readable storage medium according to claim 4, the process further comprising selecting a combination of a plurality of relations selected by the calculating to generate a relation structure.

6. The computer-readable storage medium according to claim 5, wherein the selecting a combination of a plurality of relations selects the relation combination according to a predetermined rule.

7. The computer-readable storage medium according to claim 5, the process further comprising calculating a relation structure score which is a value based on the relation score of the relations included in the relation structure generated by the selecting a combination of a plurality of relations.

8. The computer-readable storage medium according to claim 7, wherein the calculating a relation structure score selects a relation structure having the largest relation structure score, so as to write the selected relation structure to a storage.

9. The computer-readable storage medium according to claim 7, wherein the calculating a relation structure score displays a predetermined number of the relation structures in the descending order of the relation structure score thereof, on a screen.

10. The computer-readable storage medium according to claim 7, wherein the calculating a relation structure score displays field values included in the relation in the relation structure, on a screen.

11. A database analysis apparatus comprising:

a collection section that collects a plurality of tables from a storage connected to the database analysis apparatus;

a field evaluation section that calculates, for each field of each of the plurality of tables, a field score which is a value based on the appearance frequency of each value in the field;

a relation generation section that selects tables different from each other as a relation source table and relation destination table from the plurality of tables, the relation source table having a field different from each of fields in the relation destination table, selects a relation source field which is a field in the relation source table and a relation destination field which is a field in the relation destination table, and generates a combination of the relation source field and the relation destination field as a relation; and a relation evaluation section that calculates, for each relation generated by the relation generation section, a relation strength from the relation source field to the relation destination field based on the appearance frequency of each value in the relation destination field duplicated in each relation source field, the relation strength indicating correspondence between values in the relation source field and values in the relation destination field, and calculates a relation score which is a value based on the relation strength thus calculated, a field score of the relation source field, and a field score of the relation destination field.

12. The database analysis apparatus according to claim 11, wherein the relation generation section selects a key field which is a field in the relation source table and generates a combination of the relation source field, the relation destination field, and the key field as a relation, and the relation evaluation section calculates a relation score of the relation generated by the relation generation section, the relation score being a value based on the appearance frequency of each value in the relation destination field duplicated in each relation source field, the field score of the relation source field, the field score of the relation destination field, and a field score of the key field.

13. The database analysis apparatus according to claim 11, wherein
the smaller the appearance frequency of each value in the field is, the smaller the field score thereof becomes, and
the relation generation section selects the relation source field from a field whose field score is smaller than a predetermined field score threshold.

14. The database analysis apparatus according to claim 11, wherein
the closer the appearance frequency of each value in the relation destination field duplicated in each relation source field is to 1, the larger the relation score becomes, and the smaller the field score for each field included in the relation and the field score of the key field are, the larger the relation score becomes, and
the relation evaluation section selects a predetermined number of relations in the descending order of the relation score thereof.

15. The database analysis apparatus according to claim 14, further comprising a relation structure generation section that selects a combination of a plurality of relations selected by the relation evaluation section to generate a relation structure.

16. The database analysis apparatus according to claim 15, wherein
the relation structure generation section selects the relation combination according to a predetermined rule.

17. The database analysis apparatus according to claim 15, further comprising a relation structure evaluation section that calculates a relation structure score which is a value based on the relation score of the relations included in the relation structure generated by the relation structure generation section.

18. The database analysis apparatus according to claim 17, wherein
the relation structure evaluation section selects a relation structure having the largest relation structure score, so as to write the selected relation structure to another storage.

19. The database analysis apparatus according to claim 17, wherein
the relation structure evaluation section displays, on a screen of a display, a predetermined number of the relation structures in the descending order of the relation structure score thereof.

20. A database analysis method comprising:
collecting a plurality of tables from a storage;
calculating, for each field of each of the plurality of tables, a field score which is a value based on the appearance frequency of each value in the field;
selecting tables different from each other as a relation source table and a relation destination table from the plurality of tables, the relation source table having a field different from each of fields in the relation destination table, selecting a relation source field which is a field in the relation source table and a relation destination field which is a field in the relation destination table, and generating a combination of the relation source field and the relation destination field as a relation; and
calculating, for each relation generated, a relation strength from the relation source field to the relation destination field based on the appearance frequency of each value in the relation destination field duplicated in each relation source field, the relation strength indicating correspondence between values in the relation source field and values in the relation destination field, and calculating a relation score which is a value based on the relation strength thus calculated, a field score of the relation source field, and a field score of the relation destination field.

* * * * *